(12) United States Patent
Daley

(10) Patent No.: US 6,190,795 B1
(45) Date of Patent: Feb. 20, 2001

(54) SNAP-IN BATTERY MOUNTING BASE

(75) Inventor: James T. Daley, Grafton, WI (US)

(73) Assignee: Johnson Controls Technology Company, Plymouth, MI (US)

( * ) Notice: Under 35 U.S.C. 154(b), the term of this patent shall be extended for 0 days.

(21) Appl. No.: 09/213,042

(22) Filed: Dec. 16, 1998

Related U.S. Application Data

(60) Provisional application No. 60/074,168, filed on Feb. 9, 1998.

(51) Int. Cl.⁷ .................................................. H01M 2/10
(52) U.S. Cl. ........................... 429/100; 429/96; 429/186; 439/500
(58) Field of Search ................................... 429/100, 186, 429/96; 320/112, 113; 439/500

(56) References Cited

U.S. PATENT DOCUMENTS

| | | | |
|---|---|---|---|
| 3,956,021 | 5/1976 | Tsygankov et al. | 136/166 |
| 4,213,078 | * 7/1980 | Ferrell et al. | 429/100 X |
| 4,221,450 | * 9/1980 | Sears | 429/100 X |
| 4,657,335 | 4/1987 | Koch et al. | 339/256 R |
| 4,734,063 | 3/1988 | Koch et al. | 439/844 |
| 4,846,295 | 7/1989 | Shepard et al. | 180/68.5 |
| 5,251,105 | 10/1993 | Kobayashi et al. | 361/683 |
| 5,436,088 | * 7/1995 | Castaneda et al. | 429/96 |
| 5,508,123 | * 4/1996 | Fan | 429/100 X |

FOREIGN PATENT DOCUMENTS

| | | |
|---|---|---|
| 4120968 | 1/1992 | (DE) . |
| 2115601 | 9/1983 | (GB) . |
| 5-266869 | 10/1993 | (JP) . |
| 8-185840 | 7/1996 | (JP) . |
| 8-273646 | 10/1996 | (JP) . |
| 9-213291 | 8/1997 | (JP) . |
| 9-270274 | 10/1997 | (JP) . |

OTHER PUBLICATIONS

KonneKtech Publication, "Radsock Advantage" (No Date).
KonneKtech Publication, "Electrosource, Battery–to–Battery Interconnections Featuring Radsock High Amperage Electrical Connectors" (No Date).
KonneKtech Publication, "Radsock" (No Date).
KonneKtech Publication, "Radsock Connectors" (No Date).
Patent Abstracts of Japan; Abstract for JP 63–119156, Published May 23, 1998.
Patent Abstracts of Japan; Abstract for JP 09–213291, Published Aug. 15, 1997.
Patent Abstracts of Japan; Abstract for JP 09–270274, Published Oct. 14, 1997.
Patent Abstracts of Japan; Abstract for JP 08–273646, Published Oct. 18, 1996.
Patent Abstracts of Japan; Abstract for JP 08–185840, Published Jul. 16, 1996.
Patent Abstracts of Japan; Abstract for JP 05–266869, Published Oct. 15, 1993.
Patent Abstracts of Japan; Abstract for JP 10–223189, Published Aug. 21, 1998.
PCT Search Report for PCT/US99/02233, Jun. 1999.

* cited by examiner

Primary Examiner—John S. Maples
(74) Attorney, Agent, or Firm—Quarles & Brady LLP

(57) ABSTRACT

A battery having a housing with a lower rim and a pair of terminals projecting from one face is releasably mounted in a base. The base has a floor with side rails and an upright at one end. Spring loaded contacts are mounted in the upright to engage the terminals on the battery housing. The side rails have clips that engage the lower rim when the battery is placed in the base to hold the battery housing against the floor. A hinged releasable latch formed in the base engages the rear of the rim to hold the terminals against the contacts.

20 Claims, 2 Drawing Sheets

SNAP-IN BATTERY MOUNTING BASE

This application claims the benefit of U.S. provisional application Ser. No. 60/074,168, filed Feb. 9, 1998.

BACKGROUND OF THE INVENTION

This invention relates to electric storage batteries, and particularly to a quick connection and mounting of the battery within a holder.

Most present automotive batteries used for starting the engines use the familiar SAE-type lead post terminals. Such terminals usually require a lead ring-type connector on the cable. The lead ring is typically tightened by means of a nut and bolt, thereby requiring tools for installation and resulting in a relatively difficult and inconvenient installation process.

It is the object of this invention to provide a mounting base for an engine starting battery in which the battery may be easily connected to the vehicle ignition system and snapped into the base without the use of tools. The mounting base completes the necessary electrical contact of the battery terminals to the electrical system of the automobile and also securely mounts the battery.

SUMMARY OF THE INVENTION

According to the invention, a battery mounting base has an upright at one end with two spring loaded contacts that mate with the terminals of a battery when the battery is inserted in the base. The mounting base has a locking mechanism that aligns the battery with the contacts and firmly anchors the battery without the need for further hold down hardware. A release lever on the base allows the battery to be withdrawn from the base.

The invention also resides in the combination of a battery and a mounting base in which the battery has a housing with a pair of spaced terminals extending from one face and the base includes a floor with an upright at one end having a pair of spaced contacts adapted to engage the terminals. Interengaging members on the battery housing and the base releasably lock the housing in the base.

The mounting base is particularly useful in mounting thin metal film batteries. The spring loaded contacts insure a low resistance connection to the battery terminals so that available power to the ignition system is maximized.

The present invention eliminates the requirements for tools, increases the convenience for the installer, and decreases the likelihood of minor hand injuries or other injuries resulting from scraped or bruised knuckles, wrist strains, or electrical arcing caused by unintentional short circuiting of battery terminals by wrenches or other tools.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
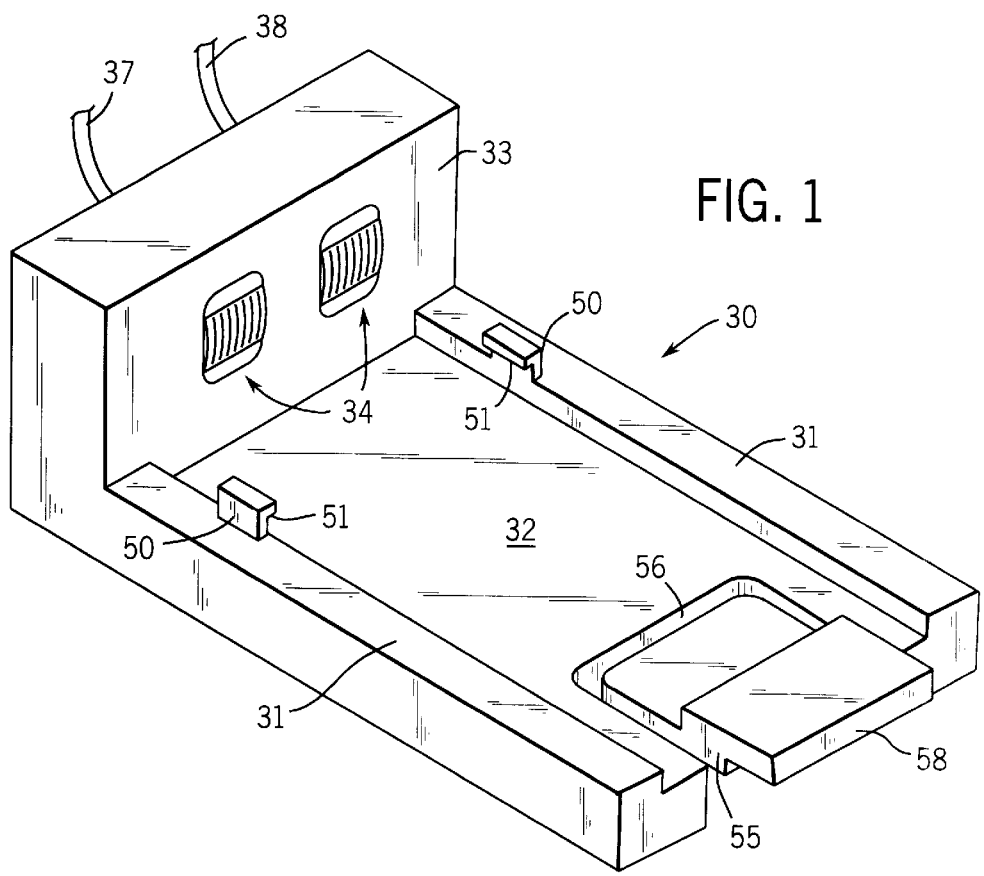
FIG. 1 is a view in perspective of a battery mounting base in accordance with the present invention.
Figure 2:
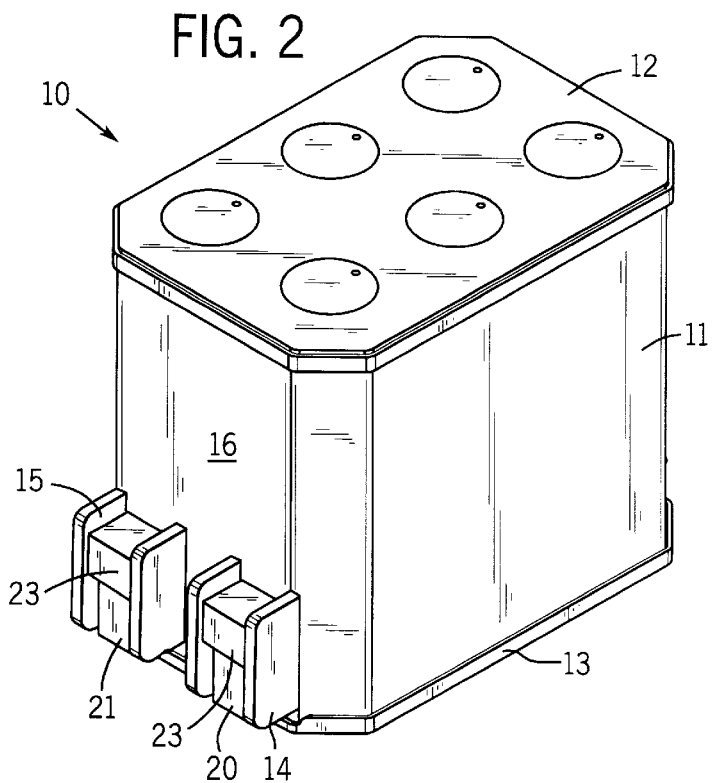
FIG. 2 is a view in perspective of a battery to be mounted in the base of FIG. 1.
Figure 3:
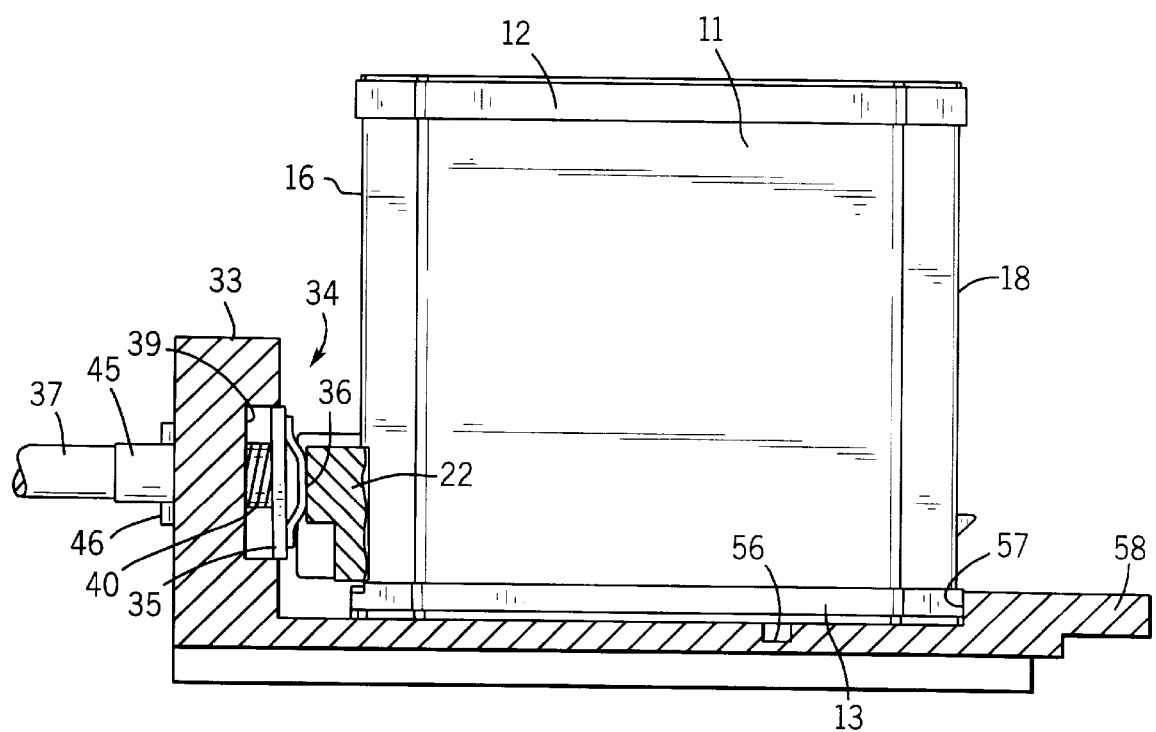
FIG. 3 is a view in side elevation and partially in vertical section of a battery mounted in the base.

Referring to the drawings, the invention is shown in connection with a thin metal film lead-acid battery of the type that is illustrated and described in U.S. Pat. No. 09/008,719, and assigned to the assignee of this application. The disclosure of the patent is hereby incorporated by reference as though fully set forth herein.

The battery 10 has a case which contains a plurality of spirally wound thin metal film cells (not shown). The case includes a body 11, a top 12, and a bottom 13 that are heat sealed to the body 11. As shown in the drawings, the edges of the top and bottom 12 and 13 project beyond the sides and ends of the body 11 to define rims. The body 11 includes integral, laterally projecting terminal housings 14 and 15 adjacent the lower portion of an end wall 16.

The cells within the body are serially connected to each other and to terminals 20 and 21 that are received in the terminal housings 14 and 15. The terminals are each formed of a body 22 of lead or a lead alloy that has a projecting face 23.

The mounting base, indicated generally by the numeral 30, is formed with side rails 31, a floor 32, and a front upright 33. A pair of contacts 34 are mounted in the face of the upright 33. The contacts 34 each include a copper plate 35 to which resilient conductive members 36 are attached. Each copper plate 35 is electrically connected to a wire 37 or 38 that is part of the vehicle electrical system. The copper plates 35 are received in recesses 39 in the upright 33 and are biased toward engagement with the battery terminals by springs 40. The wires 37 and 38 have metal ferrules 45 through which pins 46 extend to limit the outward bias of the springs 40.

The base 30 includes clips 50 rising from each side rail 31. The clips 50 have ledges 51 that overlie the floor 32 of the base. The ledges 51 are spaced above the floor 32 a distance equal to the height of the rim of the bottom 13 of the battery 10. The base 30 also has a latch 55 connected to the bottom 32 by a living hinge section 56. The latch 55 includes an upright face 57 and a release lever 58 extending away from the face 57.

The battery 10 is inserted in the base 30 by sliding the battery bottom 13 beneath the ledges 51 of the clips 50. The faces 23 of the terminals 20 and 21 engage the contacts 34 which will yield until the rear of the bottom 13 of the battery 10 seats against the face 57 of the latch 55 which firmly holds the battery in the base. The battery 10 is removed by lowering the release lever 58 to allow the battery to be slid out of the base 30.

What is claimed is:

1. A mounting base for a battery including a battery housing having a laterally extending rim at the bottom of the battery housing and a pair of spaced terminals extending from a face of the battery housing, the mounting base comprising:

a floor upon which the battery housing may rest, the floor having opposed sides and opposed first and second ends;

a side rail rising from each of the opposed sides of the floor, each side rail including a clip that engages the rim of the battery housing to hold the battery housing against the floor when the battery is mounted on the mounting base;

an upright at the first end of the floor, the upright including a pair of spring loaded contacts for engaging the battery terminals and making electrical connections to the battery when the battery is mounted on the mounting base; and a releasable latch at the second end of the floor, the latch engaging the rim of the battery housing when the battery is mounted on the mounting base.

2. The mounting base of claim 1 wherein:

the latch is integral with and hinged to the floor.

3. The mounting base of claim 2 wherein:

the latch has an upright face and a release lever extending away from the upright face.

4. The mounting base of claim 1 wherein each contact comprises:

a conductive plate, and a spring disposed between the upright of the mounting base and the conductive plate for biasing the conductive plate toward the battery terminals when the battery is mounted on the mounting base.

5. The mounting base of claim 4 wherein each contact is disposed in a recess in the upright of the mounting base.

6. The mounting base of claim 4 wherein each conductive plate includes a resilient conductive member projecting from a face of the conductive plate.

7. The mounting base of claim 4 further comprising:

a pair of conductors, each conductor being electrically connected to the conductive plate of one of the pair of contacts.

8. The mounting base of claim 7 further comprising:

a stop associated with each conductor for limiting the movement of the conductive plate by the spring.

9. The mounting base of claim 8 wherein each stop comprises:

a pin attached to a ferrule on the conductor and engageable with the upright of the mounting base.

10. A mounting base for a battery including a battery housing having a laterally extending rim at the bottom of the battery housing and a pair of spaced terminals extending from a face of the battery housing, the mounting base comprising:

a floor upon which the battery housing may rest, the floor having opposed sides and opposed first and second ends;

a side rail rising from each of the opposed sides of the floor, each side rail including a clip that engages the rim of the battery housing to hold the battery housing against the floor when the battery is mounted on the mounting base;

an upright at the first end of the floor, the upright including a pair of spring loaded contacts for engaging the battery terminals and making electrical connections to the battery when the battery is mounted on the mounting base; and a releasable latch at the second end of the floor, the latch being integral with and hinged to the floor, the latch engaging the rim of the battery housing when the battery is mounted on the mounting base.

11. The mounting base of claim 10 wherein:

the latch has an upright face and a release lever extending away from the upright face.

12. The mounting base of claim 10 wherein each contact comprises:

a conductive plate, and a spring disposed between the upright of the mounting base and the conductive plate for biasing the conductive plate toward the battery terminals when the battery is mounted on the mounting base.

13. The mounting base of claim 12 wherein each contact is disposed in a recess in the upright of the mounting base.

14. The mounting base of claim 12 wherein each conductive plate includes a resilient conductive member projecting from a face of the conductive plate.

15. The mounting base of claim 12 further comprising:

a pair of conductors, each conductor being electrically connected to the conductive plate of one of the pair of contacts.

16. The mounting base of claim 15 further comprising:

a stop associated with each conductor for limiting the movement of the conductive plate by the spring.

17. The mounting base of claim 16 wherein each stop comprises:

a pin attached to a ferrule on the conductor and engageable with the upright of the mounting base.

18. A mounting base for a battery including a battery housing having a laterally extending rim at the bottom of the battery housing and a pair of spaced terminals extending from a face of the battery housing, the mounting base comprising:

a floor upon which the battery housing may rest, the floor having opposed sides and opposed first and second ends;

a side rail rising from each of the opposed sides of the floor, each side rail including a clip that engages the rim of the battery housing to hold the battery housing against the floor when the battery is mounted on the mounting base;

an upright at the first end of the floor, the upright including a pair of spring loaded contacts for engaging the battery terminals and making electrical connections to the battery when the battery is mounted on the mounting base, each contact comprising a conductive plate, and a spring disposed between the upright of the mounting base and the conductive plate for biasing the conductive plate toward the battery terminals when the battery is mounted on the mounting base; and a releasable latch at the second end of the floor, the latch being integral with and hinged to the floor, the latch engaging the rim of the battery housing when the battery is mounted on the mounting base.

19. The mounting base of claim 18 further comprising:

a stop associated with each conductor for limiting the movement of the conductive plate by the spring.

20. The mounting base of claim 19 wherein each stop comprises a pin attached to a ferrule on the conductor and engageable with the upright of the mounting base.

\* \* \* \* \*